Nov. 29, 1966 C. J. MENKE 3,287,807
POROUS CHEESE MOLD WITH A FOLLOWER
Filed Nov. 25, 1964

INVENTOR
CORNELIS JOHANNES MENKE

BY Buckman and Archer
ATTORNEYS 3,287,807
POROUS CHEESE MOLD WITH A FOLLOWER
Cornelis Johannes Menke, Groningen, Netherlands, assignor to Van Wijk & Boerma N.V., Groningen, Netherlands, a corporation of Dutch law
Filed Nov. 25, 1964, Ser. No. 413,916
Claims priority, application Netherlands, Nov. 25, 1963, 300,947
3 Claims. (Cl. 31—44)

The invention relates to a cheese mould with a follower, both of form-retaining material, the cheese mould having a moisture-transmitting wall.

From the Dutch patent specification 104,078 it is known to use perforated stainless steel as material for the cheese mould. Since a technical limit is set to the fineness of the perforations, in this known cheese mould the inner wall is provided with uniformly distributed and closely packed recesses, which have a maximum depth of 1.5 mm. and make the surface rough. By this means a proper removal of the moisture filtered from the cheese is ensured without cheese particles penetrating into the perforations, but it is a drawback of this method that the surface of the cheese also becomes rough and thus the crust obtained is not so good.

It is the object of the invention, while avoding the above-mentioned drawback, to furnish a cheese mould with a follower which can also be employed without the use of a cloth, while the wall of the mould has good filtering capacity and no solid material can penetrate into it, while moreover the cheese is readily ejected from the mould under any circumstances.

This object is attained according to the invention by the feature that the cheese mould, and preferably also the follower consists at least on the inside of a material having a porous structure.

The material preferably consists of metal or plastic particles that have been sintered or stuck together.

It has been found that in a cheese mould according to the invention the cheese had been pressed to the desired final volume more rapidly than in a conventional cheese mould, while moreover it is superfluous to turn over the cheese and press it a second time as well as to cut off the edge. The ejection of the cheese does not present any difficulty, the inner wall of the cheese mould and the follower does not contain any curd particle, and the cheese develops a fine and regular crust.

The invention will now be explained by reference to the drawing, wherein.

Figure 1:
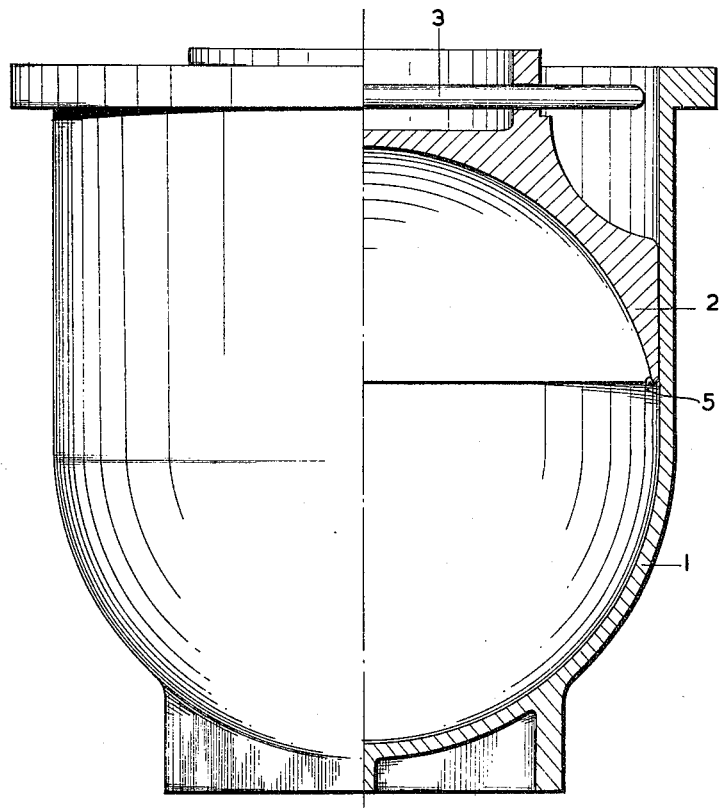
FIGURE 1 illustrates an embodiment of the invention wherein the left half shows a front view and the right half shows a vertical section of a cheese mould with a follower.
Figure 2:
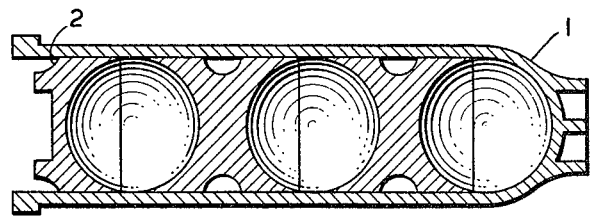
FIGURE 2 illustrates a cross-sectional view of an embodiment of the invention wherein a plurality of followers are employed.

The cheese mould 1 has a semi-spherical bottom and a cylindrical side wall continuous therewith, while the follower 2 is also semi-spherical and is provided with a relatively sharp lower edge 5 to ensure its engaging firmly about the mass of curd as it is lowered, and also with a handle 3.

The cheese mould 1 and the follower 2 consists of porous material, i.e. a material in which during the shaping small inter-communicating recesses or channels passing through the material have been left. The material may be obtained, for instance, by sticking or sintering together granular, fibrous, or thread-like products of a very small size, or by causing solidifiable or hardenable liquids to solidify or to harden in a dispersion relation with air as the second component. For the basic material from which the porous material is formed, use can be made of metal, glass, and other ceramic material as well as of thermoplastic and thermosetting plastics.

In principle any porous material thus obtained can be used for the object in view, but preference is given to those materials which are most satisfactory as regards cost price, tensile strength, form stability, corrosion resistance, resistance to high temperatures and aggressive chemicals.

A strikingly good result is obtained when the whole cheese mould and the follower consist of a material with a pore width below $100\mu$.

The cheese mould with follower described above, which has been made from substantially spherical particles of stainless steel that had been sintered together, said particles having diameters varying from 100 to $200\mu$, so that the average pore width was about $50\mu$, was used in a cheese-making process for pressed Gouda cheese side by side with conventional wooden moulds furnished with cloths, and it was found that the cheese which was made in the mould according to the invention had been pressed to the desired final volume twice as rapidly, while moreover it appeared to be superfluous to turn over the cheese and press it a second time as well as to cut off the edge. The ejection of the cheese did not present any difficulty. The inner wall of the cheese mould and the follower did not contain any curd particle. The cheese had a fine and regular crust.

The use of the cheese mould according to the invention causes a considerable saving of labour, while moreover the subsidiary production of the so-called edge cheese of inferior quality can be completely avoided.

A similar result was obtained with cheese moulds which had been made of sintered plastics. Thus, polyethylene granules with a particle size varying from 5 to $20\mu$ were stuck together, an average pore width of about $4\mu$ being produced, and the material thus obtained appeared to give good results for a cheese mould according to the invention.

The sticking-together may be effected in various ways, e.g. by means of the adhesive properties of the granules upon heating, by means of an adhesive, or by means of an evaporating solvent which makes the surface of the granules sticky. Air may be blown through with a view to the rapid removal of a solvent if any has been used.

It is not necessary to make the cheese mould and the follower entirely of uniformly porous material. It is also possible to support a relatively thin inner wall of porous material with fine pores by means of a mass of coarser material sintered on to it, which therefore also has wider pores. Furthermore it is also possible to support a relatively thin wall by means of supporting ribs on the outside of said wall.

The cheese mould according to the invention also may be in the form of a long cylindrical mould with a semi-spherical bottom and with a number of followers in it, each of said followers, with the exception of the upper one having opposite semi-spherical cheese engaging faces, so that a number of cheeses may be formed in it simultaneously.

What I claim is:

1. A cheese mold comprising a base portion and a follower portion adapted to form with said base portion a closed chamber, at least the interior walls of said base portion consisting of individual solid particles that are joined together to provide a surface having pores, each pore width being smaller than 100 microns.

2. A cheese mold with a follower according to claim 1, wherein said interior walls consist of particles that have been sintered together.

3. A cheese mold according to claim 1, wherein the mold contains a number of followers.

References Cited by the Examiner
UNITED STATES PATENTS

| | | | |
|---|---|---|---|
| 2,267,918 | 12/1941 | Hildabolt | 210—510 X |
| 2,297,248 | 9/1942 | Rudolph | 260—2.5 |
| 2,454,982 | 11/1948 | Wallace | 210—510 X |
| 2,851,776 | 9/1958 | Czulak et al. | 31—46 |
| 2,877,903 | 3/1959 | Veres | 210—462 |
| 2,963,163 | 12/1960 | Veres | 210—496 |
| 2,982,661 | 5/1961 | Thompson | 99—178 |
| 3,001,582 | 9/1961 | Kindseth et al. | 162—411 |
| 3,041,153 | 6/1962 | Elder et al. | 31—44 X |
| 3,154,853 | 11/1964 | Dubbeld | 31—44 |

SAMUEL KOREN, *Primary Examiner.*
ALDRICH F. MEDBERY, *Examiner.*